United States Patent
Schweiker et al.

(10) Patent No.: US 9,415,454 B2
(45) Date of Patent: Aug. 16, 2016

(54) METHOD FOR MACHINING A WORKPIECE AND MACHINE TOOL DESIGNED THEREFOR

(75) Inventors: Helmut Schweiker, Steinheim an der Murr (DE); Andreas Vogel, Gurbrue (CH); Johannes Brogni, Dotzigen (CH)

(73) Assignee: Gleason-Pfauter Maschinenfabrik GmbH, Ludwigsburg (DE)

( * ) Notice: Subject to any disclaimer, the term of this patent is extended or adjusted under 35 U.S.C. 154(b) by 572 days.

(21) Appl. No.: 13/991,432

(22) PCT Filed: Jan. 19, 2012

(86) PCT No.: PCT/EP2012/000249
§ 371 (c)(1),
(2), (4) Date: Jun. 4, 2013

(87) PCT Pub. No.: WO2012/098002
PCT Pub. Date: Jul. 26, 2012

(65) Prior Publication Data
US 2013/0266391 A1    Oct. 10, 2013

(30) Foreign Application Priority Data
Jan. 20, 2011    (DE) .......................... 10 2011 009 027

(51) Int. Cl.
*B23F 5/16*    (2006.01)
*B23F 17/00*    (2006.01)

(52) U.S. Cl.
CPC .............. *B23F 17/003* (2013.01); *B23F 5/163* (2013.01); *Y10T 409/10795* (2015.01); *Y10T 409/105247* (2015.01); *Y10T 409/105565* (2015.01)

(58) Field of Classification Search
CPC .............. B23F 5/163; B23F 5/16; B23F 5/12; B23F 1/04
USPC ............ 409/33–36, 38, 50–51, 56–57, 25, 31
IPC ......................................................... B23F 5/16
See application file for complete search history.

(56) References Cited

U.S. PATENT DOCUMENTS 1,820,409 A * 8/1931 Trbojevich ................ B23F 5/16
                                                                    407/28
2,338,528 A * 1/1944 Miller ..................... B23F 19/06
                                                                    409/33

(Continued)

FOREIGN PATENT DOCUMENTS

DE         243514 C     2/1912
DE       4122460 C1 *   4/1992    .............. B23F 5/163
DE     102008037514 A1  5/2010

OTHER PUBLICATIONS

Klocke, Fritz et al., "Hard Gear Finishing With A Geometrically Defined Cutting Edge", Gear Technology, Nov./Dec. 1999, pp. 24-29.

(Continued)

*Primary Examiner* — Daniel Howell
(74) *Attorney, Agent, or Firm* — Robert L. McDowell

(57) ABSTRACT

In a method for the machining of a workpiece (2) which is driven in rotary movement about a workpiece axis (Z) and whose shape includes a periodic structure, specifically a workpiece with gear teeth, a cutting tool which has gear-like teeth with a cutting edge formed at a frontal end of the teeth and which is driven in rotary movement about a cutting tool axis that is radially spaced apart from the workpiece axis, is brought into a rolling engagement with the workpiece under a crossing angle between the two rotary axes, wherein the cutting edge removes material from the workpiece through a cutting movement that has a component in the direction parallel to the workpiece axis, and wherein for the machining of the workpiece over a desired axial range the cutting tool is in addition made to perform a feed movement having a component parallel to the workpiece axis. According to the method, the feed movement component parallel to the workpiece axis and the cutting movement component parallel to the workpiece axis are oriented in opposite directions relative to each other.

12 Claims, 3 Drawing Sheets

(56) References Cited

U.S. PATENT DOCUMENTS

| | | | | |
|---|---|---|---|---|
| 2,354,670 A * | 8/1944 | Drummond | ............ | B23F 19/06 409/31 |
| 2,660,929 A * | 12/1953 | Praeg | ............ | B23F 19/06 409/33 |
| 3,264,940 A * | 8/1966 | Wildhaber | ............ | B23F 5/202 407/36 |
| 3,915,059 A * | 10/1975 | Pine | ............ | B23F 5/16 409/36 |
| 3,931,754 A * | 1/1976 | Nishijima | ............ | B23F 5/163 407/28 |
| 5,174,699 A * | 12/1992 | Faulstich | ............ | B23F 5/163 409/26 |
| 8,939,687 B2 * | 1/2015 | Heinemann | ............ | B23F 5/163 409/28 |
| 2011/0268523 A1 | 11/2011 | Heinemann | | |
| 2014/0234043 A1 * | 8/2014 | Nakahara | ............ | B23F 5/20 409/12 |

OTHER PUBLICATIONS

Lindberg, Roy A., "Processes and Materials of Manufacture, The Milling Process", Jan. 1, 1990, p. 326.

International Search Report and Written Opinion for PCT/EP2012/000249.

* cited by examiner

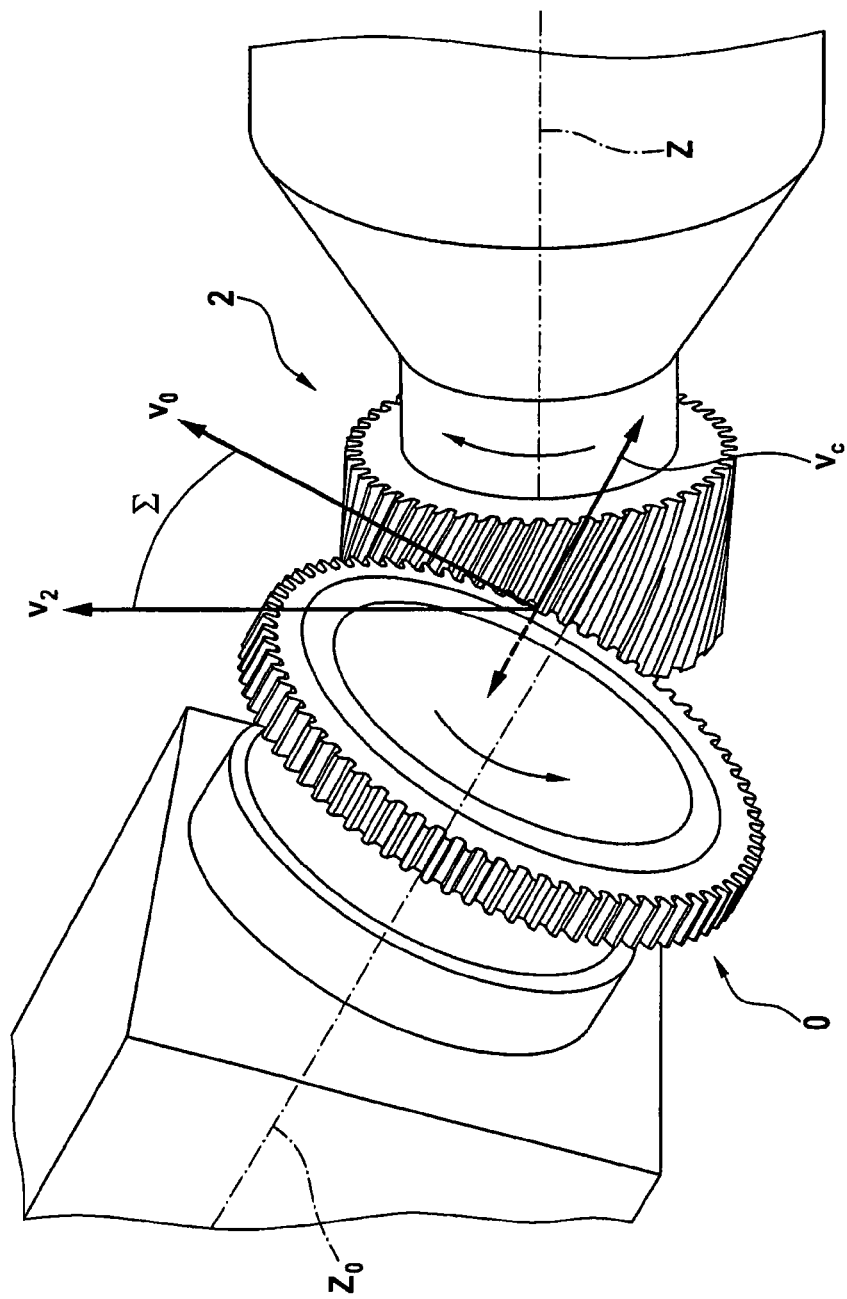

Fig. 2a
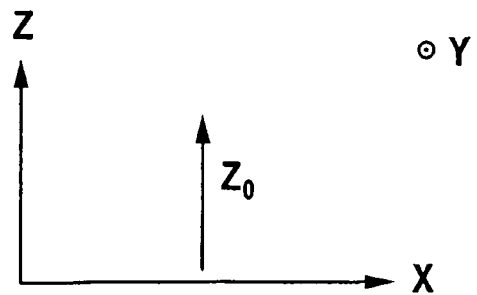
Fig. 2b
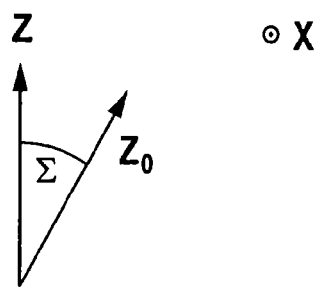
Fig. 3
→ $v_{c,\parallel}$
→ $f_z(1)$
→ $f_z(2)$
→ $f_z(n-1)$
← $f_z(n)$

METHOD FOR MACHINING A WORKPIECE AND MACHINE TOOL DESIGNED THEREFOR

The invention concerns a method for the machining of a workpiece which is driven in rotary movement about a workpiece axis and whose shape includes a periodic structure, specifically a workpiece with gear teeth, wherein a toothed cutting tool with a cutting edge formed at a frontal end of its teeth, which is driven in rotary movement about a cutting tool axis that is radially spaced apart from the workpiece axis, is brought into rolling engagement with the workpiece under a crossing angle between the two rotary axes, wherein the cutting edge removes material from the workpiece through a cutting movement that has a component in the direction parallel to the workpiece axis, and wherein for the machining of the workpiece over a desired axial range the cutting tool is in addition made to perform a feed movement having a component parallel to the workpiece axis. The invention further concerns a machine tool designed to carry out the method.

Machining methods where the movement of the machine axes involved follows this kind of kinematic pattern have been known for more than a hundred years (see DE 243 514). This includes for example the process of skiving a cylindrical gear work piece with external or internal teeth by means of a skiving wheel. The following comments relate specifically to this example, but to the extent that they can be used for other applications, they are definitely also valid for more general processes in accordance with the generic portion of claim 1.

The skiving process, like the better-known hobbing, may be categorized among the group of chip-removing production processes that use a geometrically determined cutting edge. In contrast to the process of hobbing, where the machining process emulates the example of a worm gear in the field of rotary drive mechanisms, the skiving process can be compared to the example of a helical gear transmission, being characterized by a skewed arrangement of the respective rotary axes of the gear work piece and the skiving wheel. In this context, the relative movement between the two wheels is also referred to as a screw-type movement.

With the cutting edge which is formed at the frontal ends of the tooth flanks of the skiving wheel and which therefore lies, relative to a plane that is orthogonal to the workpiece axis, in a plane that is inclined by the crossing angle between the two rotary axes, the rolling movement between skiving wheel and gear workpiece can be used for a rotary cutting movement through which the teeth on the workpiece blank can be generated. The main cutting direction in this process runs along the tooth gaps of the toothed profile being generated.

In comparison to hobbing, this process has the significant advantage of providing higher cutting rates at the same cutting pass velocities, because the kinematic properties produce a more effective cutting engagement within the same amount of time. In addition, skiving proves to be advantageous in particular for the complete generating or machining process of internal gear teeth, where hobbing can be used only to a limited extent and where skiving offers advantages also in comparison to shaping in regard to machining time.

On the other hand, the skiving process has disadvantages in regard to the configuration of the tool geometry, because with skiving it is not always possible to rely on the theory of the reference profile. Also, the transmission ratio between the skiving wheel and the gear workpiece is clearly smaller in comparison to bobbing, and minor errors in the transmission ratio directly affect the quality of the gear being produced, so that extremely precise machine settings are required in order to achieve a high machining quality.

According to the known state of the art of producing/finishing a spur gear, the skiving wheel is configured with helical teeth (with a helix angle $\beta_0$), and the crossing angle Z is selected to be equal to the helix angle $\beta_0$ of the skiving wheel. If the gear workpiece being machined is to receive helical teeth with a helix angle $\beta_2$, the helix angle $\beta_2$ is superimposed on the crossing angle $\Sigma$ of the axes, wherein $\beta_2$ is given a negative sign if the flank twists of the skiving wheel and the gear workpiece have the same sense of rotation, and a positive sign if the flank twists have the opposite sense of rotation. In addition, according to conventional practice, while the feed movement of the skiving wheel advances parallel to the workpiece axis Z, the basic rotation of the workpiece which is a function of the rolling engagement needs to be accompanied by an additional, superimposed mode of rotation in order to avoid cutting into the workpiece flanks in the axial feed movement. A more detailed description of the principles of skiving and also of the kinematically analogous hard-skiving of already hardened work pieces may be found, e.g., in Thomas Bausch et al., *Innovative Zahnradfertigung*, Expertverlag.

In principle, it is possible to produce a gear workpiece with the skiving process in a single operation using only one feed movement. However, in particular when a larger quantity of material is to be removed or for the purpose of reducing the stress on the skiving wheel, it is also conventional practice to perform the machining in a plurality of work operations, wherein between any two feed movements, the skiving wheel is returned to the starting position with a pull-back movement, and the next feed movement is performed with a bigger cutting depth in the direction of the radial distance between axes. This is described for example in DE 10 2008 037 514 A1.

Nevertheless, it has been found that with the state-of-the-art skiving methods of the foregoing description, the quality of the workpiece produced/finished is still not completely satisfactory even if the process is performed in several passes.

The invention therefore has the objective to provide a chip-removing machining method which, while based on the kinematics of skiving, achieves a higher level of quality in the machined workpiece.

From a process-engineering point of view, this task is solved through a further development of the method described in the introduction, wherein the improvement is essentially characterized by the fact that the feed movement and the cutting movement are coordinated in such a way that their respective components parallel to the workpiece axis are oriented in opposite directions.

In investigations leading to the invention it was found that, by using a feed movement whose component parallel to the workpiece axis is oriented in the opposite direction of the workpiece-axis-parallel component of the cutting movement which results from the rolling engagement of the skiving wheel, an improved quality of the cut surfaces that are machined in this manner is obtained. In contrast to the conventional machining techniques, specifically in the present example of skiving, where the tool pushes the peeled-off shavings ahead of itself, the method of the invention is characterized by a pulling action of the tool. This reduces the risk that the shavings could become jammed in the tooth gap being machined, which could negatively affect the quality of the cut surface of the tooth gap.

Besides, the known conditions regarding construction and kinematics which govern the relationship between axial feed and cutting movement relative to their respective components parallel to the workpiece axis can also be used as a guideline for the method according to the invention. In particular, a skiving wheel can be used whose basic body shape is conical and which therefore already has the required clearance angles as an inherent feature of its design. However, it is also possible to work with a skiving wheel whose basic body shape is cylindrical, in which case the clearance angles are realized through the movements of the machine axes, in particular by shifting the position of the skiving wheel (eccentricity "e").

Furthermore, the method is applicable to the production of spur gears and helix gears with external teeth as well as with internal teeth, subject to the same requirements for a sufficiently large crossing angle Z between tool axis and workpiece axis that also apply to conventional skiving. The cutting edge can also be configured with a stepped edge grind.

In a preferred version of the method, a feeding pass in the "pulling" direction as specified in the invention is preceded by one or more machining passes in the opposite feed direction, i.e. with a "pushing" feed as known from the conventional state of the art. Accordingly, in a machining process where one or more rough-cutting passes are performed according to conventional practice, where possible defects from jammed chips can be at least partially remedied by a subsequent finishing pass, this subsequent finishing pass is performed with the "pulling" feed movement according to the invention in combination with the rotary cutting movement resulting from the rolling engagement, wherein the problem of jammed shavings will not occur anymore.

It is conceivable in principle to use a radial infeed movement for the one or more machining passes, whereupon the cutting is performed with the axial feed movement. In some cases, particularly in the manufacturing of workpieces in the form of cylindrical axles carrying one or more toothed profiles, it may however be advantageous to also perform a radial feed movement, which could likewise be superimposed to take place at the same time as the axial feed movement. This opens in particular the possibility to cut a desired shape of an axial phase-in or phase-out section of the tooth gap of the work piece.

Dependent on how the dynamic superposition of the feed movements is controlled, it is possible to produce a phase-in or phase-out of an arcuate shape that runs tangentially into the tooth gap. As an alternative, a phase-in or phase-out section entering the tooth gap in steps is also conceivable. This provides more freedom for the axial movement of the tool.

The machining method can also be applied with workpieces that have already been hardened (hard skiving). However, the preferred use of the method is before the hardening process (skiving). In addition, with the skiving process the cutting can be performed directly on a blank without preparatory machining. Nevertheless, it is also possible to machine workpieces that have undergone preliminary steps, wherein the basic shape of the teeth is already formed and only the intended final form of the teeth remains to be produced by the process of the invention.

Depending on the size of the workpiece to be manufactured, the size of the skiving wheel, and the crossing angle of the axes dictated by the helix angles of the workpiece and the skiving wheel, the feed movement of the tool can either be directed parallel to the workpiece axis or also parallel to the tool axis wherein the latter movement represents, in relation to the workpiece axis, a combination of an axial and a tangential feed movement. The former kind of movement is advantageous in particular for the production of internal gear profiles. Of course, based on the helix angles and the feed velocity, the workpiece has to be subjected in the conventional manner to an additional rotary movement which needs to be superimposed on the basic rotation that is necessary for the rolling engagement, in order to obtain the correct skiving engagement conditions for every position Z of the tool on the workpiece axis.

A skiving wheel can generally carry a helical tooth arrangement. On the other hand, if the teeth to be generated on the workpiece already have a sufficiently large helix angle, the skiving wheel can also preferably have a spur-gear tooth arrangement.

From an apparatus-oriented point of view, a machine tool is put under patent protection which has the machine axes as described above for the performance of the method, with the capability to perform machine axis movements under computerized numerical control (CNC), and which includes a controller system under whose command the machine axis movements required for one or more of the aforementioned variants of the method can be performed.

Furthermore, the scope of protection also extends to workpieces that were manufactured with the method according to the foregoing description in its basic form or according to one or more of the further aspects of the method as presented herein.

Further characteristic features, details and advantages of the invention are presented in the following description which refers to the attached drawings, wherein FIG. 1 illustrates a rolling engagement between a skiving wheel and a gear workpiece which is in the process of being machined;

FIGS. 2a, 2b are orientation drawings to illustrate the relationship between axes;

FIG. 3 illustrates directional components of cutting- and feed movements that occur in the method according to the invention.

Figure 4A:
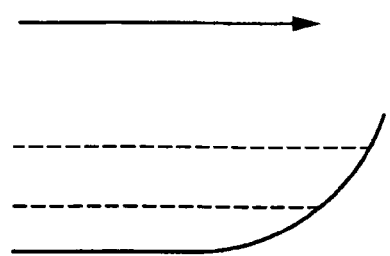
FIGS. 4a, 4b schematically illustrate the ends of a tooth gap of a workpiece.

The tool shown in FIG. 1 in the form of a skiving wheel $0$ is used for the skiving of the gear workpiece $2$ that is being machined, which is likewise shown in FIG. 1. In this process, the two wheels $0$ and $2$ in FIG. 1 are in rolling engagement with each other, with the tool axis $Z_0$ and the workpiece axis Z crossing each other at a distance under the crossing angle $\Sigma$ which in the example of FIG. 1 corresponds to the helix angle of the gear teeth being produced on the workpiece $2$. The directional relationship between the axes is illustrated again in FIG. 2 in two self-explanatory drawings.

The skiving wheel $0$ is conical in its basic body shape and the clearance angles required for the cutting of the workpiece $2$ are therefore already an integral part of the design of the skiving wheel $0$. The teeth of the skiving wheel $0$ are designed in the manner of a spur gear, and in the rolling engagement the teeth of the skiving wheel $0$ have the same orientation as the tooth gaps of the workpiece $2$. The cutting edge which is formed at the free end of the teeth of the skiving wheel $0$ generates the tooth gaps of the workpiece $2$ in a rotating cutting movement. In order to cover the full tooth width of the work piece $2$, the skiving wheel $0$ performs an axial feed movement which can be directed parallel to the tool axis $Z_0$ or also parallel to the workpiece axis Z. Besides the basic rotation of the workpiece $2$ which is necessary for the rolling engagement, an additional mode of rotation may have to be superimposed depending on the axial feed movement of the skiving wheel $0$, in order to maintain in every position Z of the skiving wheel $0$ the correct skiving engagement conditions for the tooth profile to be generated. In any case, the axial feed movement will have a component $f_z$ parallel to the workpiece axis Z.

The primary cutting direction (cutting velocity) occurring in the skiving process, indicated in FIG. 1 as $v_c$, is obtained as a result of the respective tangential velocity vectors $v_0$ and $v_2$ at the location of the cutting engagement between the cutting edge and the workpiece material to be cut. The component of the cutting direction $v_c$ that runs parallel to the workpiece axis Z, indicated in FIG. 3 as $v_{c,\|}$, is directed from left to right in FIG. 1.

Up to this point, the foregoing description corresponds to the state-of-the-art skiving process, wherein the axial feed movement likewise has a component parallel to the workpiece axis directed from left to right in the representation of FIG. 1. If the cutting is performed in more than one pass, the removal of material can be spread over the several passes by pulling back the skiving wheel 0 between passes and increasing the cutting depth in each pass by adjusting the distance between the axes.

In contrast to the state-of-the-art skiving method of the foregoing description, the concept proposed in the present invention is to perform the axial feed movement of the skiving wheel 0 in such a way that its component parallel to the workpiece axis has the opposite direction of the component of the cutting movement relative to the same workpiece axis, i.e. that the component of the axial feed movement parallel to the workpiece axis is directed from right to left in FIG. 1 and, accordingly, the feed movement represents a "pulling" movement, which reduces the risk of chip jamming.

In the example that is schematically illustrated in FIG. 3, this "reverse" feed movement—relative to the prior-art method—is performed in the last of n cutting passes, i.e. in the finishing pass, while the preceding n–1 passes, for example rough-machining passes, are performed with the conventional feed movement, where the feed component parallel to the workpiece axis is oriented in the same direction as the cutting movement component parallel to the same axis (shown at the top of FIG. 3 as $v_{c,\|}$) which occurs as a result of the rolling engagement with the two rotary axes crossing each other.

FIG. 3 shows the vector component $v_{c,\|}$ and the axial feed components parallel to the workpiece axis, wherein $f_z(i)$ denotes the respective axial feed component in the i-th machining pass.

Figure 4B:
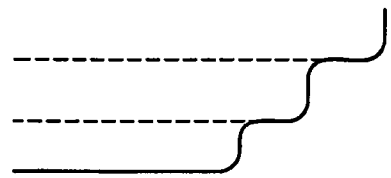

These axial feed movements $f_z(i)$ can be accompanied by an additional, superimposed feed movement in the radial direction, i.e. a distance change between the axes, for example in order to generate a desired geometry at the axial ends of the tooth gaps. Examples of tooth gaps with a phase-in or phase-out portion generated with the superimposed radial feed movement are shown in FIG. 4, wherein FIG. 4a shows an arcuate phase-out portion and FIG. 4b shows a stepped phase-out portion of the tooth gap. The broken lines in FIG. 4 represent the respective cutting depths for the successive cutting passes, which are achieved by superimposing the radial advance or radial infeed on the axial feed movement. A preferred application for this profile variation at the ends of the tooth gap occurs in the machining of cylindrical axes which carry a toothed profile extending over an axial length corresponding to the tooth width and which are otherwise configured in a way that limits the permissible movement range of the cutting tool. This applies in particular to cylindrical axes with different sections carrying different toothed profiles.

Different setting parameters can be selected for the aforementioned rough-cutting passes and finishing passes, particularly in regard to the absolute rates of rotation of skiving wheel and workpiece and/or in regard to the feed velocities.

The invention is not limited to the details discussed in the illustrated embodiment. Rather, the features named in the description and in the claims, taken individually or in any combination, can prove essential in realizing the invention in its different embodiments.

The invention claimed is:

1. Method for the machining of a workpiece (2) which is driven in rotary movement about a workpiece axis (Z) and whose shape comprises a periodic structure, specifically a workpiece with gear teeth, wherein
    a cutting tool (0) having gear-like teeth, having a cutting edge formed at a frontal end of its teeth, and being driven in rotary movement about a cutting tool axis ($Z_0$) that is spaced apart in the direction (X) of the radial distance from the workpiece axis (Z), is brought into a rolling engagement with the workpiece (2) under a crossing angle ($\Sigma$) between the two rotary axes (Z, $Z_0$), wherein the cutting edge removes material from the workpiece (2) through a cutting movement that has a component in the direction parallel to the workpiece axis, and wherein for the machining of the workpiece (2) over a desired axial range the cutting tool is in addition made to perform a feed movement having a component parallel to the workpiece axis,
    characterized in that
    the feed movement component parallel to the workpiece axis and the cutting movement component parallel to the workpiece axis are oriented in opposite directions relative to each other,
    wherein the machining is performed in at least two passes with different cutting depths of the tool (0) in the direction (X) of the distance between the tool axis and the workpiece axis, and wherein the feed movement with the component oriented in the reverse direction of the cutting movement component is performed in a subsequent pass which is preceded by a machining pass with the opposite feed direction.

2. Method according to claim 1, wherein the machining is performed in at least three passes, wherein the subsequent pass is the last machining pass and all preceding passes are performed with the opposite feed direction, wherein between two such machining passes a pull-back movement of the tool occurs during which there is no cutting engagement with the workpiece.

3. Method according to claim 1 wherein the feed movement having the component parallel to the workpiece axis as an axial feed movement is accompanied by a superimposed radial feed movement in the direction of the shortest distance between the axes.

4. Method according to claim 3, wherein through said superposition of the two feed movements, a desired shape of an axial phase-in or phase-out portion of the tooth gap of the workpiece is cut.

5. Method according to claim 4, wherein the phase-in or phase-out portion of the tooth gap is of an arcuate shape that runs tangentially into the tooth gap.

6. Method according to claim 4, wherein the phase-in or phase-out portion of the tooth gap is shaped in a sequence of steps.

7. Method according to claim 1 wherein the machining comprises skiving.

8. Method according to claim 1 wherein a gear with external teeth is machined/produced, and wherein the axial feed movement is directed in particular parallel to the tool axis.

9. Method according to claim 1 wherein a gear with internal teeth is machined/produced, and wherein the axial feed movement is in particular directed parallel to the workpiece axis.

10. Method according to claim 1 wherein the gear teeth that are being machined/produced are helical teeth and the teeth of the cutting tool are spur gear teeth.

11. Machine tool for machining a workpiece, comprising a tool spindle defining a workpiece axis ($Z$) on which a work piece can be driven in rotary movement, a tool spindle defining a tool axis ($Z_0$) that is spaced apart from the workpiece axis at an adjustable distance in the direction ($X$) of the radial distance of the axes, wherein the tool axis crosses the workpiece axis under an adjustable axis-crossing angle and a cutting tool (0) can be driven in rotary movement about the tool axis ($Z_0$), and further comprising a controller which directs the movements of the machine axes in such a way that a cutting tool having gear-like teeth with a cutting edge formed at a frontal end of said teeth is brought into rolling engagement with the work piece, wherein the cutting edge removes material from the workpiece through a cutting movement having a component in the direction parallel to the workpiece axis, while the cutting tool additionally performs a feed movement having a component in the direction parallel to the workpiece axis, characterized in that the controller further directs the machine axis movements in such a way that the feed movement component parallel to the workpiece axis and the cutting movement component parallel to the workpiece axis are oriented in opposite directions relative to each other, wherein the machining is performed in at least two passes with different cutting depths of the tool (0) in the direction ($X$) of the distance between the tool axis and the workpiece axis, and wherein the feed movement with the component oriented in the reverse direction of the cutting movement component is performed in a subsequent pass which is preceded by a machining pass with the opposite feed direction.

12. Work piece whose shape comprises a periodic structure, in particular a workpiece with gear teeth, which was produced and/or machined under a method according to claim 1.

* * * * *